United States Patent
Lim et al.

(10) Patent No.: US 8,364,915 B2
(45) Date of Patent: Jan. 29, 2013

(54) METHOD, APPARATUS AND SYSTEM FOR GENERATING ACCESS INFORMATION FROM AN LRU TRACKING LIST

(75) Inventors: Kie Woon Lim, Simpang Ampat (MY); Khee Wooi Lee, Bayan Lepas (MY); William A. Stevens, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 12/822,034

(22) Filed: Jun. 23, 2010

(65) Prior Publication Data
US 2011/0320742 A1   Dec. 29, 2011

(51) Int. Cl.
*G06F 12/00*   (2006.01)
(52) U.S. Cl. ........ 711/156; 711/144; 711/145; 711/154; 711/160; 711/170; 711/173
(58) Field of Classification Search ............... 711/144, 711/145, 156, 160, 170, 173, 205–209, 221
See application file for complete search history.

(56) References Cited

U.S. PATENT DOCUMENTS

| | | | |
|---|---|---|---|
| 7,769,979 B1 * | 8/2010 | Glasco et al. | 711/203 |
| 2006/0174053 A1 * | 8/2006 | Anderson et al. | 711/6 |
| 2008/0109629 A1 * | 5/2008 | Karamcheti et al. | 711/170 |

OTHER PUBLICATIONS

Cheng, Autoscaling Radix-4 FFT for TMS320C6000, Application Report, SPRA654—Mar. 2000, Texas Instruments, 12 pages.

* cited by examiner

*Primary Examiner* — Arpan P. Savla
(74) *Attorney, Agent, or Firm* — Blakely, Sokoloff, Taylor & Zafman LLP (57) ABSTRACT

Techniques for generating access information indicating a least recently used (LRU) memory region in a set of memory regions. In an embodiment, data is stored in an entry of an LRU tracking list (LTL) based on a touch message indicating when a memory group has been touched—e.g. read from, written to and/or associated with a memory region. The data stored in an LTL entry may include an identifier of a memory group and/or validity data specifying whether that LTL entry stores a set of default data. In another embodiment, access information may be generated based on the memory group identifier and the validity data.

17 Claims, 9 Drawing Sheets

| Use Order 310 | Page Address 320 | Group 330 | VLD 340 | A 350 |
|---|---|---|---|---|
| MRU (127) | PA_127 | 2 | 1 | 0 |
| MRU-1 (126) | PA_126 | 0 | 1 | 1 |
| MRU-2 (125) | PA_125 | 1 | 1 | 1 |
| ⋮ | ⋮ | ⋮ | ⋮ | ⋮ |
| N+1 | PA_N+1 | 3 | 1 | 1 |
| N | PA_N | 0 | 1 | 0 |
| N-1 | PA_N-1 | 3 | 1 | 1 |
| ⋮ | ⋮ | ⋮ | ⋮ | ⋮ |
| LRU+4 (4) | PA_4 | 0 | 1 | 0 |
| LRU+3 (3) | PA_3 | 2 | 1 | 1 |
| LRU+2 (2) | PA_2 | 1 | 1 | 0 |
| LRU+1 (1) | PA_1 | 0 | 0 | 0 |
| LRU (0) | PA_0 | 0 | 0 | 0 |

| G0V (Group = 0) 400 | | G1V (Group = 1) 410 | |
|---|---|---|---|
| G0V [127] | 0 | G1V [127] | 0 |
| G0V [126] | 1 | G1V [126] | 0 |
| G0V [125] | 0 | G1V [125] | 1 |
| ⋮ | ⋮ | ⋮ | ⋮ |
| G0V [N+1] | 0 | G1V [N+1] | 0 |
| G0V [N] | 1 | G1V [N] | 0 |
| G0V [N-1] | 0 | G1V [N-1] | 0 |
| ⋮ | ⋮ | ⋮ | ⋮ |
| G0V [4] | 1 | G1V [4] | 0 |
| G0V [3] | 0 | G1V [3] | 0 |
| G0V [2] | 0 | G1V [2] | 1 |
| G0V [1] | 0 | G1V [1] | 0 |
| G0V [0] | 0 | G1V [0] | 0 |

FIG. 4

| | 31 | 30 | 29 | 28 | 27 | [26:2] | 1 | 0 |
|---|---|---|---|---|---|---|---|---|
| G0VReg0 510 | 0 | G0V [0] | G0V [1] | G0V [2] | G0V [3] | G0V [4:28] | G0V [29] | G0V [30] |
| G0VReg1 520 | 0 | G0V [31] | G0V [32] | G0V [33] | G0V [34] | G0V [35:59] | G0V [60] | G0V [61] |
| G0VReg2 530 | 0 | G0V [62] | G0V [63] | G0V [64] | G0V [65] | G0V [66:90] | G0V [91] | G0V [92] |
| G0VReg3 540 | 0 | G0V [93] | G0V [94] | G0V [95] | G0V [96] | G0V [97:121] | G0V [122] | G0V [123] |
| G0VReg4 550 | 0 | G0V [124] | G0V [125] | G0V [126] | G0V [127] | Reserved (e.g. 0's) | | |

METHOD, APPARATUS AND SYSTEM FOR GENERATING ACCESS INFORMATION FROM AN LRU TRACKING LIST

BACKGROUND

1. Technical Field

Embodiments of the present invention relate to computer memory management and, more particularly, to techniques for identifying an accessing of memory in a computer device.

2. Background Art

Often, computer platforms provide architectures for fetching data from a data source to a data destination, where operation of the data destination is monitored and/or controlled by management logic. In such architectures, efficient management of the data destination's memory resources may be aided based on access information—e.g. information which describes whether and/or how one or more memory regions of the data destination have been, or have not been, accessed.

For example, determining a least recently used (LRU) page in a set of memory pages of a data destination may aid in reducing a likelihood of writing over data in the data destination which is still needed by some process or hardware. Moreover, memory groups—configurable associations of one or more memory regions—may be efficiently expanded or contracted, in size and/or in number, based on information indicating an extent to which certain member memory regions are being, or have been, accessed.

The increasing data rates of computer platforms have resulted in an increasing load on memory management resources. More particularly, the effectiveness of memory management is increasingly sensitive to the number of clock cycles which circuitry or firmware/software execution requires in generating access information on which the memory management is based. As a result, marginal improvements in the efficiency of memory management are limited by the extent of inherent time delays in current techniques for generating memory access information.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Certain embodiments provide various techniques for generating access information describing an accessing of one or more memory regions of a memory resource. Access information may be generated based on state information in an LRU tracking list (LTL)—e.g. a list of entries for maintaining state information in an order from comparatively more recently used memory regions to comparatively less recently used memory regions, or vice versa.

In an embodiment, a given entry in an LTL stores state information which is based on a respective touch message indicating that a respective memory group has been touched, where one or more memory regions are associated with the memory group. The LTL entry may include a field to store validity data specifying whether the LTL entry stores a set of default data. Alternatively or in addition, the LTL entry may include a group field to store an identifier of the memory group touched by the touch message.

In an embodiment, access information may be generated based on the validity data and the group identifier stored in a particular LTL entry. Access information may be specific to a particular memory group—e.g. describing an accessing of one or more memory regions in a memory group in relation to an accessing of one or more other memory regions in that same memory group.

Figure 1:
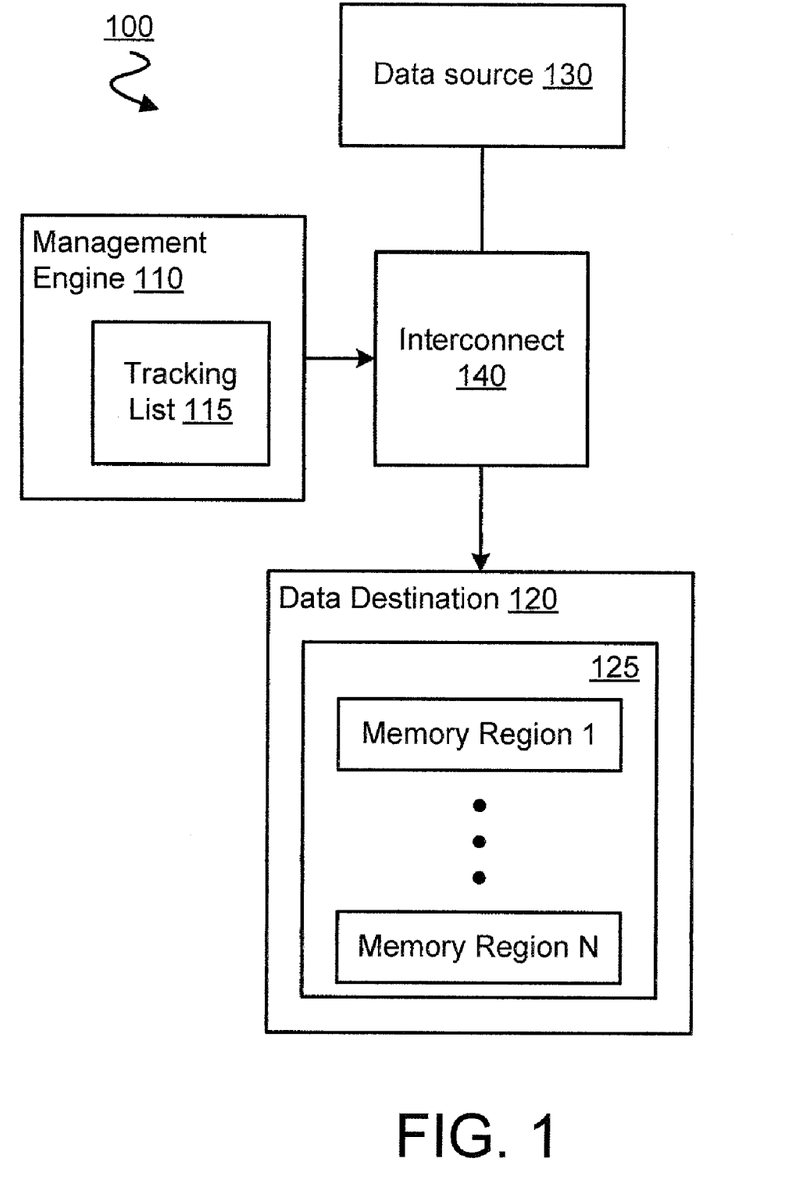
FIG. 1 is a block diagram illustrating select elements of a system to provide memory management according to an embodiment.

FIG. 1 illustrates select elements of a system 100 for providing memory management according to embodiment. System 100 may include or reside in a computer platform such as that of a desktop personal computer (PC), laptop PC, handheld device, smart phone, server, etc. In an embodiment, system 100 includes a management engine 110 which is coupled directly or indirectly to an interconnect 140 for exchanging data from a data source 130 and a data destination 120. Data source 130 may include any of a variety of combinations of hardware for storing data, including, but not limited to, a floppy disk, optical disk, CD-ROM, and magnetic-optical disk, read-only memory (ROM), random access memory (RAM) such as dynamic RAM (DRAM), EPROMs, EEPROMs, magnetic or optical cards, and the like.

Data destination 120 may include any of a variety of combinations of hardware for storing data written from data source 130. In an embodiment, data destination 120 includes a RAM. Data destination 120 may include a plurality of memory regions 125, represented as memory regions 1 through N. In an embodiment, memory regions 1 through N each include storage for a page of data—e.g. where each of memory regions 1 through N is independently page addressable. Although features of various embodiments are described herein with respect to memory regions which are each to store a page of data, it is understood that, in alternate embodiments, such memory regions may store any of a variety of additional or alternative data units.

Management engine 110 may include logic—e.g. any of a variety of combinations of hardware, firmware and/or software—to manage a fetching of data from data source 130 to a data destination 120. For example, management engine may 110 may include logic to receive, generate or otherwise process information which is used to detect, direct or otherwise manage whether and/or how data from data source 130 is to be written to data destination 120. In an embodiment, management engine 110 may include logic of a controller hub (not shown) of the computer platform for system 100. By way of illustration and not limitation, management engine 110 may include, or reside within, a platform controller hub (PCH) such one according to the Intel™ Series 5 architecture of Intel™ Corporation of Santa Clara, Calif. Alternatively, management engine 110 may be implemented within a memory controller hub (MCH) such as a "North Bridge" chip of Intel™ Corporation, or an input/output controller hub (ICH) such as a "South Bridge" chip of Intel™ Corporation.

To aid in managing the fetching of data from data source 130 to data destination 120, management engine 110 may include, or otherwise have access to, a least recently used (LRU) tracking list 115. LRU tracking list 115 includes entries to store information indicating that an accessing of one of memory regions 1 . . . N is comparatively less recent in time than an accessing of another of memory regions 1 . . . N. Conversely, such information may indicate that an accessing of a given memory region is comparatively more recent than an accessing of some other memory region. Although various features of certain embodiments are described herein with respect to evaluating comparatively less (even least) recent accesses of memory regions, it is understood that such features may, conversely, be extended to apply to evaluating comparatively more (even most) recent accesses of memory regions.

Figure 2:
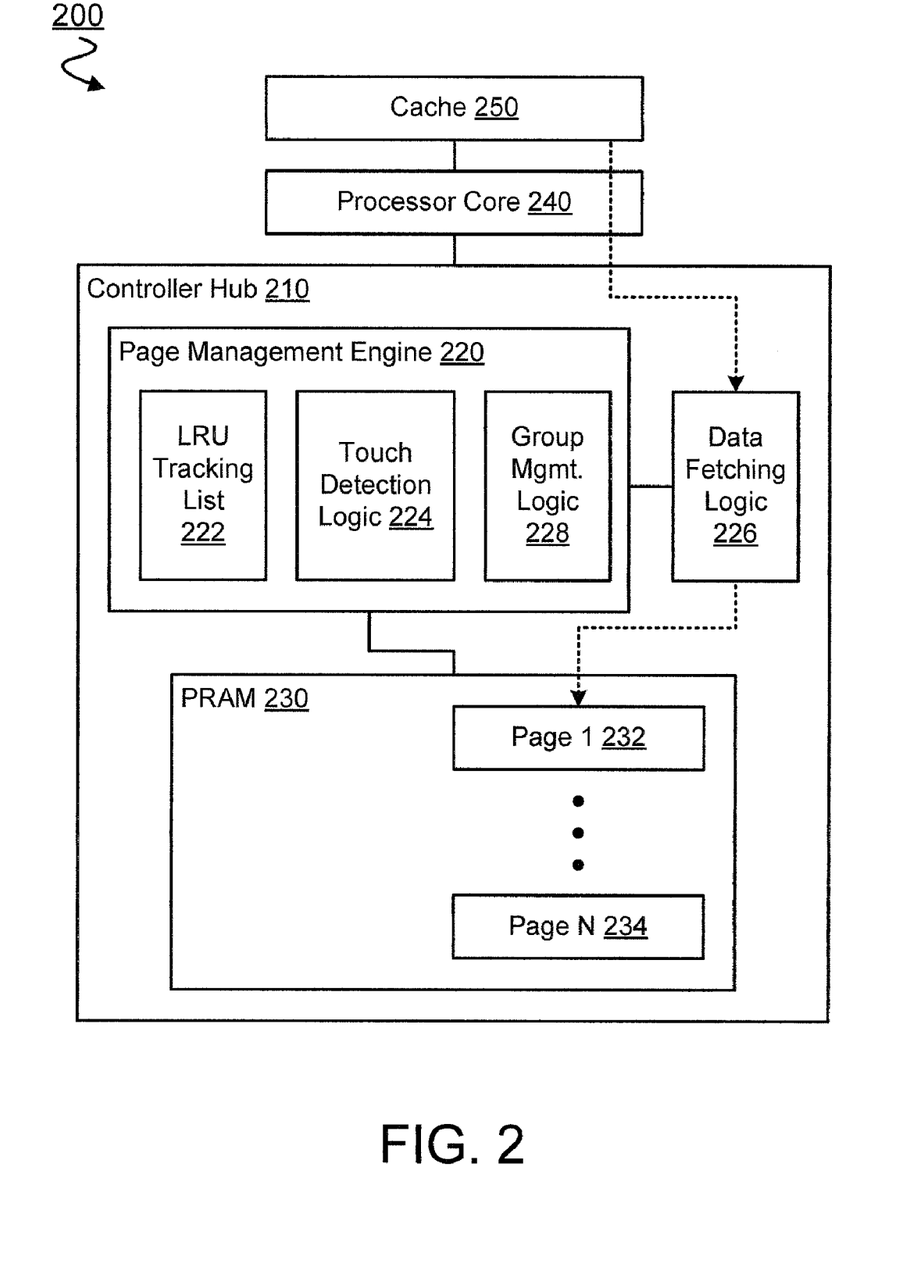
FIG. 2 is a block diagram illustrating select elements of a computer platform to generate access information for managing memory according to an embodiment.

FIG. 2 illustrates select elements of a computer platform 200 for generating access information according to embodiment. Computer platform 200 may include some or all of the features of system 100, for example.

Computer platform 200 may include a controller hub 210 to implement an accessing of data. Data fetching logic 226 of controller hub 210 may initiate or otherwise perform the fetching of various data from a cache 250 which is coupled to controller hub 210—e.g. via a processor core 240. Certain embodiments for generating access information may be implemented entirely within controller hub 210, for example.

For example, data fetching logic 226 may implement a prefetch of data from cache 250 before some anticipated request for such data—e.g. so that some performance latency of processor core 240 does not affect a resource which is expected to require the data. In an embodiment, data fetching logic 226 may reside within page management engine 220. Alternatively or in addition, cache 250 may reside on a central processing unit (CPU) which includes processor core 240.

Data fetching logic 226 may write the data fetched from cache 250 to a paging RAM (PRAM) 230 having a set of page addressable memory regions, illustrated in FIG. 1 by Page 1 232, . . . , Page N 234. It is understood that, in various embodiments, data fetching logic 226 may fetch data to and/or from any of a variety of additional or alternate data storage hardware. Although PRAM 230 is represented as part of controller hub 210, PRAM 230 alternately may be located outside of controller hub 210. In an embodiment, PRAM 230 may reside on the same silicon die as that of management engine 110.

In an embodiment, controller hub 210 includes a page management engine 220 to manage a fetching of data by data fetching logic 226. Page management engine 220 may include some or all of the features of management engine 110, for example.

Operation of data fetching logic 226 may be directly or indirectly controlled by logic of page management engine 220, which provides for various techniques of efficiently using memory resources of PRAM 230. In an embodiment, efficient use of Page 1 232 to Page N 234 may be provided at least in part by group management logic of 228 of page management engine 220. Group management logic of 228 includes hardware, firmware and/or software to selectively determine whether and/or how ones of Page 1 232 to Page N 234 might be variously associated with respective memory groups. Associating one or more pages as a particular memory group may, for example, allow data storage resources of PRAM 230 to be dedicated as that memory group to a specific resource (e.g. hardware, an application, thread, process, etc.) of computer platform 200. For example, group management logic 228 may determine that a particular thread is, or is expected to be, a larger or smaller source or sink for data. Based on such determinations, group management logic 228 may generate a message indicating whether a memory region is to be associated with, or disassociated from, a particular memory group.

An operation to associate a memory region with—or to disassociate the memory region from—a particular memory group is referred to herein as an operation which touches the memory group. A memory group may also be touched by an operation which accesses a memory region associated with the memory group. For example, operations to write data to and/or read data from a memory region associated with a memory group are operations which touch that memory group.

Page management engine 220 may also include touch detection logic 224 to receive messages—referred to herein as touch messages—indicating that a respective memory group has been touched, where the memory group includes one or more associated memory regions in a set of memory regions. By way of illustration and not limitation, group management logic 228 may generate, relay or otherwise provide to touch detection logic 224 a touch message identifying that a memory region has been or is to be associated with—or disassociated from—a particular one or more of Page 1 232 to Page N 234. Alternatively or in addition, controller hub 210 may include other logic (not shown)—e.g. in page management engine 220—to generate, relay or otherwise provide to touch detection logic 224 a touch message identifying that data has been read from and/or written one of Page 1 232 to Page N 234, where the page is associated with a particular memory group. In an embodiment, data fetching logic 226 may provide a touch message to touch detection logic 224 based on a fetching of data to Page 1 232 to Page N 234.

Based on a received touch message, touch detection logic may maintain state information associated with Page 1 232 to Page N 234—e.g. in an LRU tracking list (LTL) 222. LTL 222 may include a set of entries, each of which is to store state information based on a respective touch message. In an embodiment, the information stored in LTL 222 represents a comparative order in which some or all of Page 1 232 to Page N 234 have been used in operations touching the respective memory groups associated with said pages.

Page management logic 220 may also include logic—e.g. in touch detection logic 224—to generate access information based on the data stored in the entries of LTL 222. Such access information may describe an accessing of one or more memory regions. In an embodiment, access information may be generated which is specific to a particular memory group—e.g. where the access information describes an accessing of only one or more memory regions which belong to that memory group. Such access information may be provided to other logic of controller hub 210 to determine whether or how memory regions are to be used in future operations touching one or more memory groups.

Figure 3A:
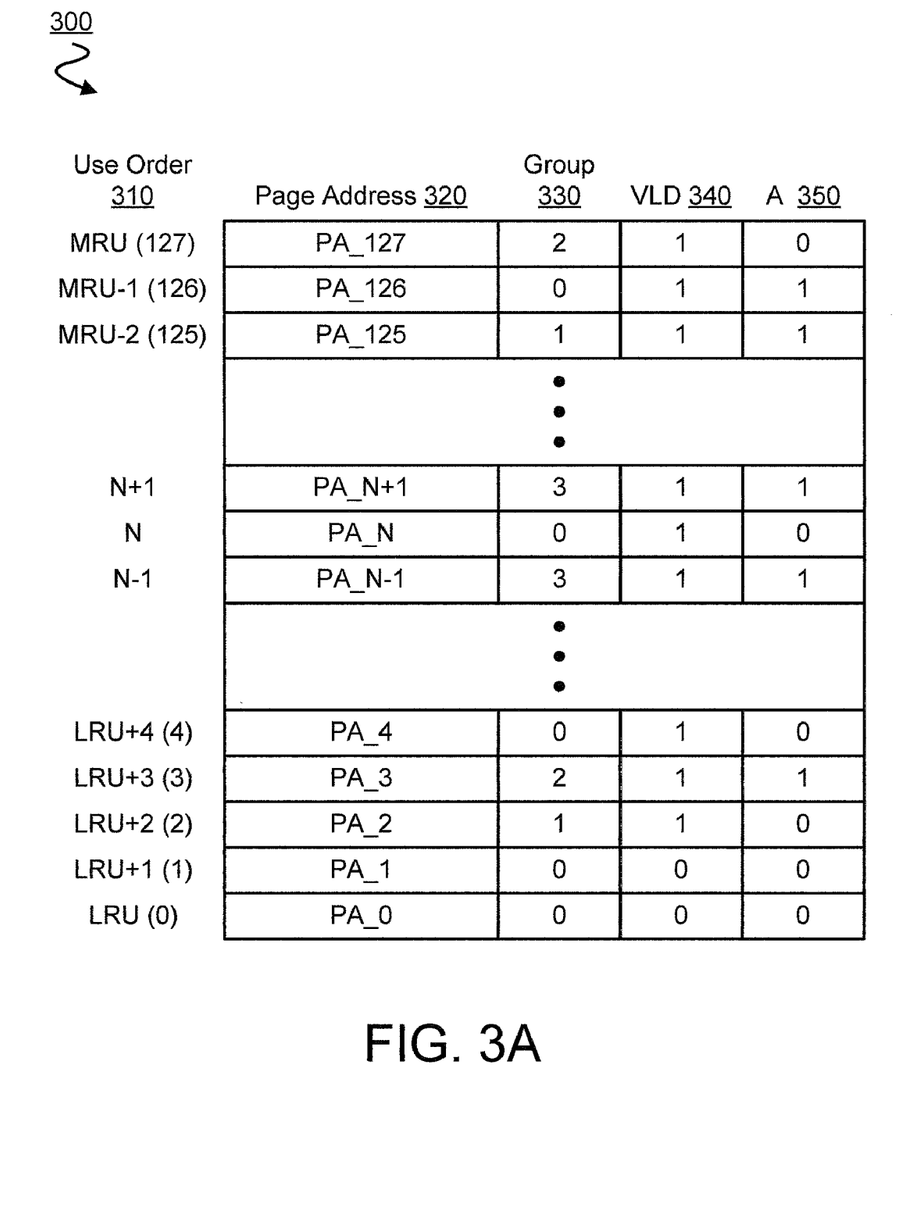
FIG. 3A is a block diagram illustrating select elements of a tracking list for use in generating access information according to an embodiment.

FIG. 3A illustrates select elements of an LTL 300 for use in generating access information according to an embodiment. LTL 300 may, for example, include some or all of the elements of LTL 222. LTL 300 includes a set of entries 310, which are represented in FIG. 3A as illustrative entries 0 through 127. It is understood that the set of entries 310 may include any of a variety of additional or alternate entries.

Information may be variously stored in the set of entries 310 based on one or more touch messages, each touch message indicating that a memory group has been touched. By way of illustration and not limitation, the set of entries 310 may be comprised of shift registers which, based on a detecting of a particular touch message, may rapidly shift data in one of the set of entries 310 either up or down the LTL 300 to some other one of the set of entries 310.

For example, state information for a latest touch message may be stored into entry 127 and subsequently shifted to other entries as newer state information is loaded. Such loading and shifting may contribute to state information from entry 127 to entry 0 being maintained in an order from comparatively more recently used memory regions to comparatively less recently used memory regions. It is understood that a converse technique of storing and shifting data up from entry 0 may contribute to state information from entry 127 to entry 0 being ordered from comparatively less recently used memory regions to comparatively more recently used memory regions.

Entries 0 through 127 may each include a set of fields to store state information associated with a respective touch message. An LTL entry may include a field to identify a memory region which is associated with a particular touch message. For example, the Physical Address field 320 may store a physical address of a page or other type of memory region.

Alternatively or in addition, an LTL entry may include a field—e.g. the Group field 330—to identify a memory group with which the identified memory region is associated. In an embodiment, the size of Group field 330 is based on a maximum number of memory groups which a page management engine can support. For example, Group field 330 may have a 2-bits, 3-bits, 4-bits etc. size to support, respectively, binary representation of up to four, eight, sixteen etc. memory groups.

Alternatively or in addition, an LTL entry may include a valid field, such as VLD field 340, to store validity data specifying whether that LTL entry stores a set of non-default data. In an embodiment, validity data identifies the LTL entry as storing data which is generated based on a touch message—as opposed to merely storing a set of default data operating as placeholder data. Such a set of default data may be stored in an LTL entry, for example, when the LTL 300 has been initialized but the LTL entry in question has yet to store any state information which is specific to a particular touch message. Alternately or in addition, a set of default data may be stored in an LTL entry, for example, in response to a removal from LTL 300 of state information which is specific to a particular touch message, where such removal requires an addition of placeholder data into the set of entries 310.

Alternatively or in addition, an LTL entry may include an access field, such as A field 350, to store access data specifying whether the memory region identified by the LTL entry has been accessed. In an embodiment, access data in an LTL entry may specify that the memory region identified by the LTL entry has been associated with a particular memory group, but that that memory region has yet to be accessed since the associating of that memory region with the memory group. Alternately, such access data may specify that that memory region has been accessed—e.g. has had data read from and/or written to it—at least once since the associating of that memory region with the memory group.

In order to illustrate features of certain embodiments, exemplary values are shown certain ones of entries 0 through 127. For example, entry 127 of the set of entries 310 stores state information indicating that a memory region which has some physical address PA_127 is currently associated with a memory group 2, and that that memory region has not been accessed since being associated with memory group 2. It is understood that any of a variety of additional or alternate values may be stored in such entries of LTL 300.

Figure 3B:
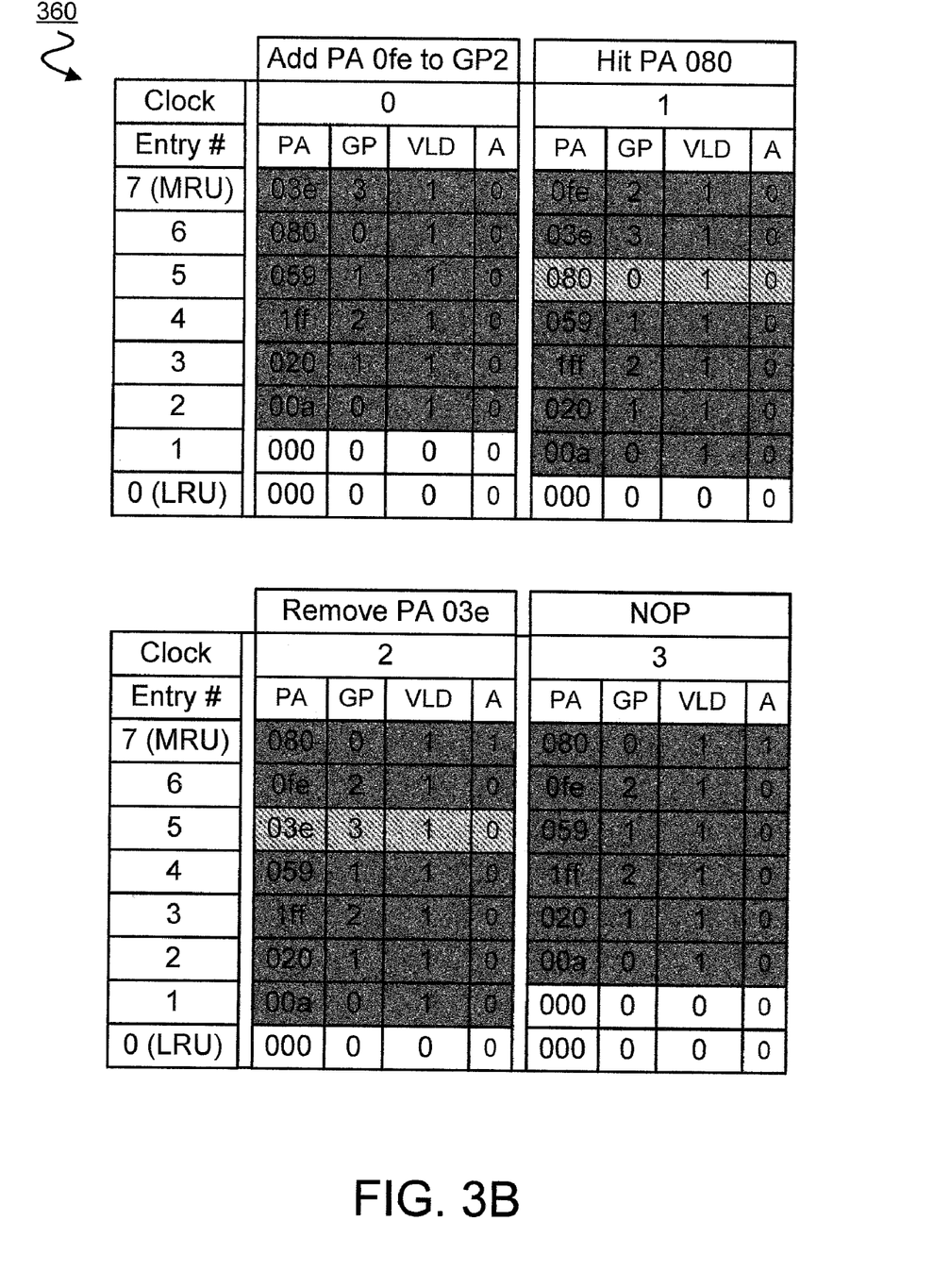
FIG. 3B is a sequence diagram illustrating a storing of data in a tracking list according to an embodiment.

FIG. 3B illustrates select elements of a sequence 360 of storing state data in an LTL according to an embodiment. The sequence 360 of storing state data may be performed, for example, with touch detection logic 224 and LTL 222. For the sake of illustrating features of certain embodiments, an LTL with entries 0, . . . , 7 is shown, each entry initially storing a respective set of data. Moreover, sequence 360 includes four stages, each associated with a respective touch message. It is understood that sequence 360 may include any of a variety of additional or alternate stages, and that the LTL in sequence 360 may include any of a variety of additional or alternate entries, each storing any of a variety of additional or alternate state information.

The LTL of sequence 360 includes entries 0, . . . 7, where state information for most recent touch messages is initially stored in entry 7, and subsequently shifted through some or all of entries 6 through 0 as newer state information is loaded into the LTL at entry 7. Entries 0 through 7 each include fields PA, GP, VLD and A which, respectively, include features of Physical Address field 320, Group field 330, VLD field 340 and A field 350

At the time of the first stage shown by sequence 360, stage 0, entries 2 through 7 all store state information which is valid—e.g. state information which is generated based on a particular touch message and which is not merely a set of default placeholder information. During stage 0, a first touch message is detected ("Add PA 0fe to GP2") indicating an addition to a memory group "2" of a page having an address "0fe". In response to a detecting of this touch message, a first set of corresponding state information is to be loaded into the LTL.

The next stage, stage 1, shows the storing of this first set of state information in entry 7, whereas sets of state information which were previously stored in entries 7 through 1 have been shifted, respectively, to entries 6 through 0. The previous data in entry 0 is shifted out of the LTL. This shifting and storing of sets of state information results in the LTL indicating that, at stage 1, the page having address "0fe" is the most recently used memory region represented in the LTL.

During stage 1, a second touch message is detected ("Hit PA 080") indicating an access of a page having the address "080". This entry is already represented by LTL entry 5 (highlighted), in stage 1, which indicates that the page at "080" has not been accessed since being associated with memory group "0"

In response to the detecting of the second touch message, the state information in entry 5 is removed, and state information above entry 5 is shifted down one entry. The state information removed from entry 5 is then stored again in entry 7 with the exception of the access field, which is changed to indicate that the page at address "080" has been accessed—e.g. written to or read from—since being associated with memory group "0".

The next stage, stage 2, shows the resulting state information in entries 0 through 7. During stage 2, a third touch message is detected ("Remove PA 03e"), indicating that a page at address "03e" is to be disassociated from its current memory group. As shown in entry 5, the page at address "03e" happens to be associated with memory group "3" at the time of stage 2.

In response to detecting the third touch message, the state information at entry 5 is removed from the LTL. In an embodiment, state information is not added to the LTL for a touch message which frees up a memory region, such as a touch message to disassociate that memory region from a memory group. In such an embodiment, such a touch message would not result in a set of state information being shifted in the LTL toward the direction of entry 0.

Rather, state information which previously resided below the removed state information in entry 5 may be shifted up one entry. Shifting up all entries at the bottom of the LTL results in a need to store in the lowest entry 0 a default set of placeholder data which is not generated from any data within a touch message. The access data value in this placeholder data identifies the placeholder data as such. A no operation (NOP) message indicates that no memory group has been touched for state 4.

Figure 4:
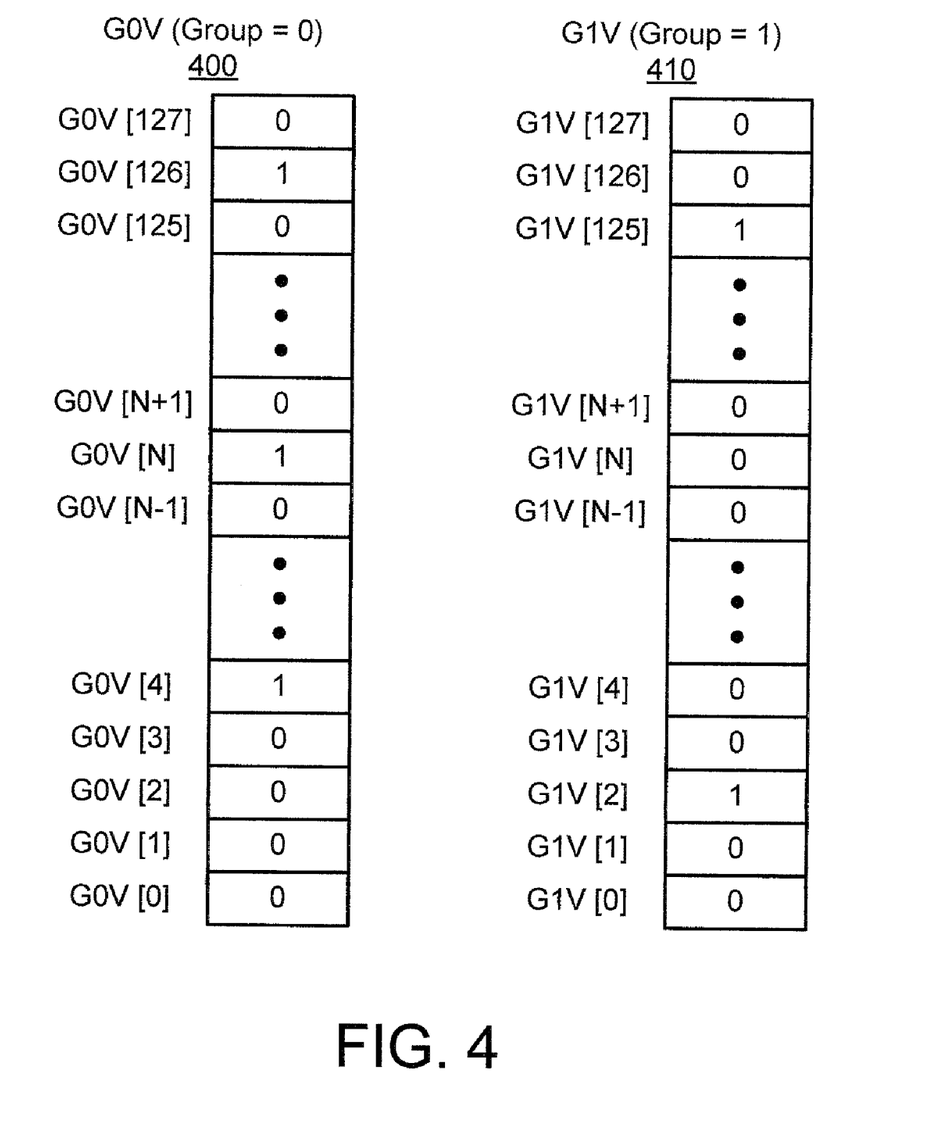
FIG. 4 is a block diagram illustrating group-valid data used to generate access information according to an embodiment.

FIG. 4 illustrates select elements of two sets of access information—a set of group-valid values G0V 400 and a set of group-valid values G1V 410—which are generated from state information of an LTL, according to an embodiment.

In order to illustrate features of various embodiments, each of G0V 400 and G1V 410 are shown as including 128 entries each, the entries storing values which are based on the illustrative state information in LTL 300. It is understood that either or both of G0V 400 and G1V 410 may include any of a variety of additional or alternate number of entries, each storing any of a variety of additional or alternate group-valid values. It is also understood that, although shown as being separate from LTL 300, some or all of the group-valid values in G0V 400 and/or G1V 410 may, in various embodiments, be stored in fields of the LTL entries to which they correspond.

G0V 400 may correspond to a memory group "0", for example, while G1V 410 may correspond to some other memory group "1". Moreover, the group-valid fields G0V[0] to G0V[127] of G0V 400 may correspond, respectively, to entries 0 through 127 of LTL 300. For each of group-valid fields G0V[0] to G0V[127], the group-field value identifies—e.g. with a single binary value—whether it is the case that the corresponding entry stores valid state information, and that that state information identifies the corresponding memory group "0". In other words, G0V[0] to G0V[127] may store group-valid data determined by the following:

$G0V[0] = (Entry0[Group] == "0"?) \text{ AND } (Entry0[VLD] == 1?),$ $G0V[1] = (Entry1[Group] == "0"?) \text{ AND } (Entry1[VLD] == 1?),$ $G0V[2] = (Entry2[Group] == "0"?) \text{ AND } (Entry2[VLD] == 1?),$

...

$G0V[126] = (Entry126[Group] == "0"?) \text{ AND } (Entry126[VLD] == 1?),$ and $G0V[127] = (Entry126[Group] == "0"?) \text{ AND } (Entry127[VLD] == 1?),$ where EntryZ identifies a Zth entry of LTL 300.

Similarly, the group-valid fields G1V[0] to G1V[127] of G1V 410 may correspond, respectively to entries 0 through 127 of LTL 300. However, for each of group-valid fields G1V[0] to G1V[127], the group-field value identifies—e.g. with a single binary value—whether it is the case that the corresponding entry stores valid state information, and that that state information identifies the corresponding memory group "1". In other words, G1V[0] to G1V[127] may store group-valid data determined by the following:

$G1V[0] = (Entry0[Group] == "1"?) \text{ AND } (Entry0[VLD] == 1?),$ $G1V[1] = (Entry1[Group] == "1"?) \text{ AND } (Entry1[VLD] == 1?),$ $G1V[2] = (Entry2[Group] == "1"?) \text{ AND } (Entry2[VLD] == 1?),$

...

$G1V[126] = (Entry126[Group] == "1"?) \text{ AND } (Entry126[VLD] == 1?),$ and $G1V[127] = (Entry127[Group] == "1"?) \text{ AND } (Entry127[VLD] == 1?).$ It is understood that the above-describe features may be extended to some set of the group-valid fields GxV corresponding to some memory group x, where group-valid y GxV[y] identifies whether it is the case that entry y of an LTL stores valid state information, and that that state information identifies the corresponding memory group x.

Figure 5:
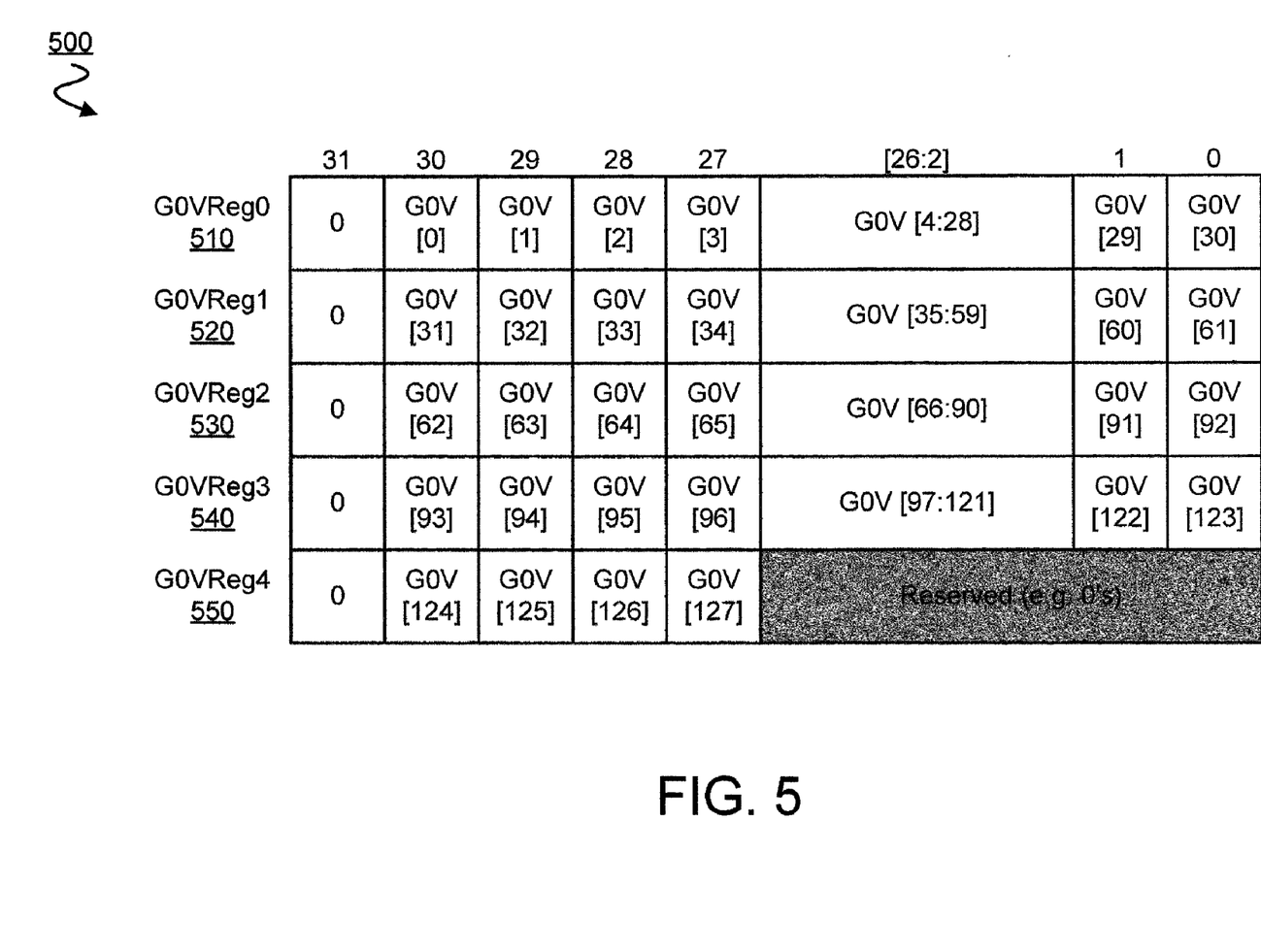
FIG. 5 is a block diagram illustrating registers storing group-valid data for generating access information according to an embodiment.

FIG. 5 illustrates a set of one or more registers 500 to store group-valid data for generating access information according to an embodiment. To illustrate features of various embodiments, the set of registers is shown including registers G0VReg0 510, G0VReg1 520, G0VReg2 530, G0VReg3 540 and G0VReg4 550, which store group-valid values—e.g. the values shown in G0V 400.

The group-valid values G0V[0] through G0V[127] may have an order corresponding to an order of use of memory regions. For example, G0V[0] may correspond to a least recently used memory region of those memory regions represented in an LTL, whereas G0V[127] may correspond to a most recently used memory region of those memory regions represented in that LTL.

The set of registers 500 may constitute an aggregate sequence of successively less significant bits, e.g. as follows:
G0VReg0[31], G0VReg0[30], . . . , G0VReg0[1], G0VReg0[0], G0VReg1[31], G0VReg1[30], . . . , G0VReg1[1], G0VReg1[0], G0VReg2[31], G0VReg2 [30], . . . , G0VReg2[1], G0VReg2[0], G0VReg3[31], G0VReg3[30], . . . , G0VReg3[1], G0VReg3[0], G0VReg4[31], G0VReg4[30], . . . , G0VReg4[1], G0VReg4[0].

In an embodiment, the group-valid values G0V[0] through G0V[127] are located, respectively, in successively less significant bits of such a sequence.

In order to aid processing of the group-valid values G0V[0] through G0V[127], the respective most significant bits of registers G0VReg0 510, G0VReg1 520, G0VReg2 530, G0VReg3 540 and G0VReg4 550 may be reserved for data other than the group-valid values G0V[0] through G0V[127]. For example, these registers' respective most significant bits may be set to one logical value such as "0". Additionally or alternatively, reserved bits may reside in one or more of the least significant bits of the last register in the sequence of registers G0VReg0 510, G0VReg1 520, G0VReg2 530, G0VReg3 540 and G0VReg4 550. For example, exhaustion of the distributed group-valid values G0V[0] through G0V [127] may leave the remaining bits—e.g. G0VReg4[26:0]—to be set to one logical value such as "0"

It is understood that, in various embodiments, the set of registers 500 may include a different number and/or size of one or more registers for storing additional or alternate group-valid values. Additionally or alternatively, the set of registers may store group-valid values based on a memory group other than the memory group "0" of LTL 300.

In an exemplary embodiment, the number of entries of an LTL may be sufficiently small for the respective binary group-valid values of every entry of the LTL to fit into a single register. In such a case, the binary group-valid values may be stored in successively less significant bits of the single register—e.g. as discussed above—where the most significant bit and any remaining least significant bits in the single register are reserved for a particular logical state, such as "0".

In an embodiment where all LTL group-valid values for a particular memory group are so stored in one register, a single NORM instruction may be used to generate access information based on the group-valid values. An example of one version of a NORM instruction is implemented in the TMS320C6000™ digital signal processor (DSP) from Texas Instruments™ of Dallas, Tex. By way of illustration and not limitation, a NORM instruction may identify from the group-valid values of the single register which is the least recently used memory region of a set of memory regions of a memory group.

As used herein, a NORM instruction refers to a normalization operation performed on an operand and returning a result. The NORM instruction is a logical equivalent of performing one or more successive evaluations XOR'ing the most significant bit of the operand with successively less significant bits of the operand. The returned value of the NORM operation is equivalent to a count of a total number of any such successive XOR evaluations which determine a logical false value (e.g. "0") before any such XOR evaluation determines a logical true value (e.g. "1").

Below is an illustrative table of operand values and their respective values returned by a NORM instruction:

TABLE 1

Values Returned by NORM Instruction for Select Operand Values

| Operand Value | Returned Value |
|---|---|
| 0x00000000 | 0x0000001F |
| 0x00000001 | 0x0000001E |
| 0x1FFFFFFF | 0x00000002 |
| 0x3FFFFFFF | 0x00000001 |
| 0xVFFFFFFF | 0x00000000 |
| 0x80000000 | 0x00000000 |
| 0xC0000000 | 0x00000001 |
| 0xE0000000 | 0x00000002 |
| 0xFFFFFFFF | 0x0000001F |

Accordingly, a NORM instruction will return the value "0x00000000" if the group-valid value of the single register which corresponds to LTL entry 0 (i.e. the LRU entry) is "1". Similarly, the NORM instruction will return the value "0x00000001", or "0x00000002", etc. if the group-valid value corresponding, respectively, to LTL entry 1, or LTL entry 2, etc. is "1". It is understood that, in another embodiment, a modified NORM instruction may be used which returns values that differ from the above-described values by some offset value—e.g. 1.

The simple logic to generate group-valid values and the use of the NORM instruction (which may return a result in a single clock cycle) provide high-speed techniques for generating access information identifying an LTL entry number for a LRU memory region.

Figure 6:
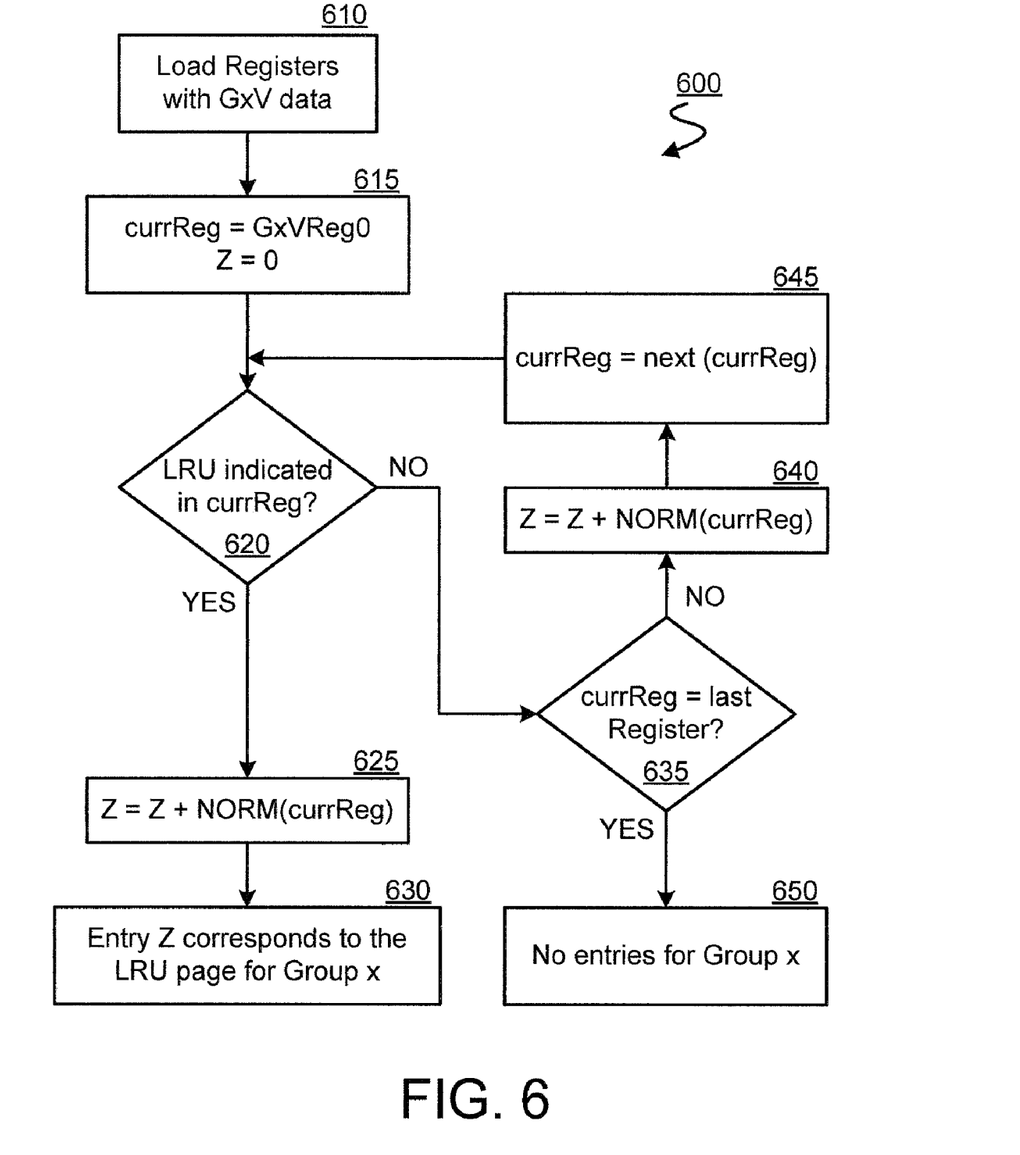
FIG. 6 is a flow diagram illustrating select elements of a method for generating access information according to an embodiment.

FIG. 6 illustrates select elements of a method 600 to generate access information according to an embodiment. By way of illustration and not limitation, some or all of method 600 may be performed by a page management engine—e.g. the touch detection logic 224 of page management engine 220.

Method 600 may process group-valid values such as that in the set of registers 500, for example. In an embodiment, method 600 includes, at 610, loading a sequence of registers with LTL group-valid values (GxV) associated with some memory group x. At 615, a variable currReg is set to an initial register GxVReg0 in the sequence of registers being evaluated by method 600. Moreover, some variable Z is set to zero (0) for subsequent tracking of bits in the sequence of registers which have been evaluated.

At 620, a determination is made as to whether the register currReg includes data indicating a least recently used memory region. In an embodiment, a NORM instruction may be performed on currReg, and a determination is made whether a value returned by NORM(currReg) is less than the total number of group-valid values in currReg. For example, if currReg stores thirty-one group-valid values, and NORM (currReg) returns a value less than "0x1F", then some bit in currReg corresponds to an LTL entry which is the least recently used memory region in memory group x. In an embodiment, the number of LTL entry in question may be directly identified from the value returned by NORM(currReg).

If it is determined that currReg includes data indicating the LRU memory region, then NORM(currReg) may be added to the variable Z, at 625, which may then be provided, at 630, in access information identifying the number of the LTL entry which corresponds to the LRU memory region within memory group x.

If currReg does not include data indicating the LRU memory region, then a determination is made, at 635, as to whether currReg is the last register in the sequence of registers storing the group-valid values. If currReg is the last register in the sequence of registers, then access information is returned, at 650, indicating that memory group x is not represented by any entry in the LTL If currReg is not the last register in the sequence, then the most recent NORM(currReg) return value may be added to the current variable Z value, at 640. Then, at 645, currReg may be set to the next register in the sequence of registers storing the group-valid values. After setting currReg to the next register for evaluation, method 600 repeats the evaluation at 620. Successive performance of operations at 620, 635, 640 and 645 may be performed until either an LRU memory region is indicated, or the entire sequence of registers has been evaluated.

Figure 7:
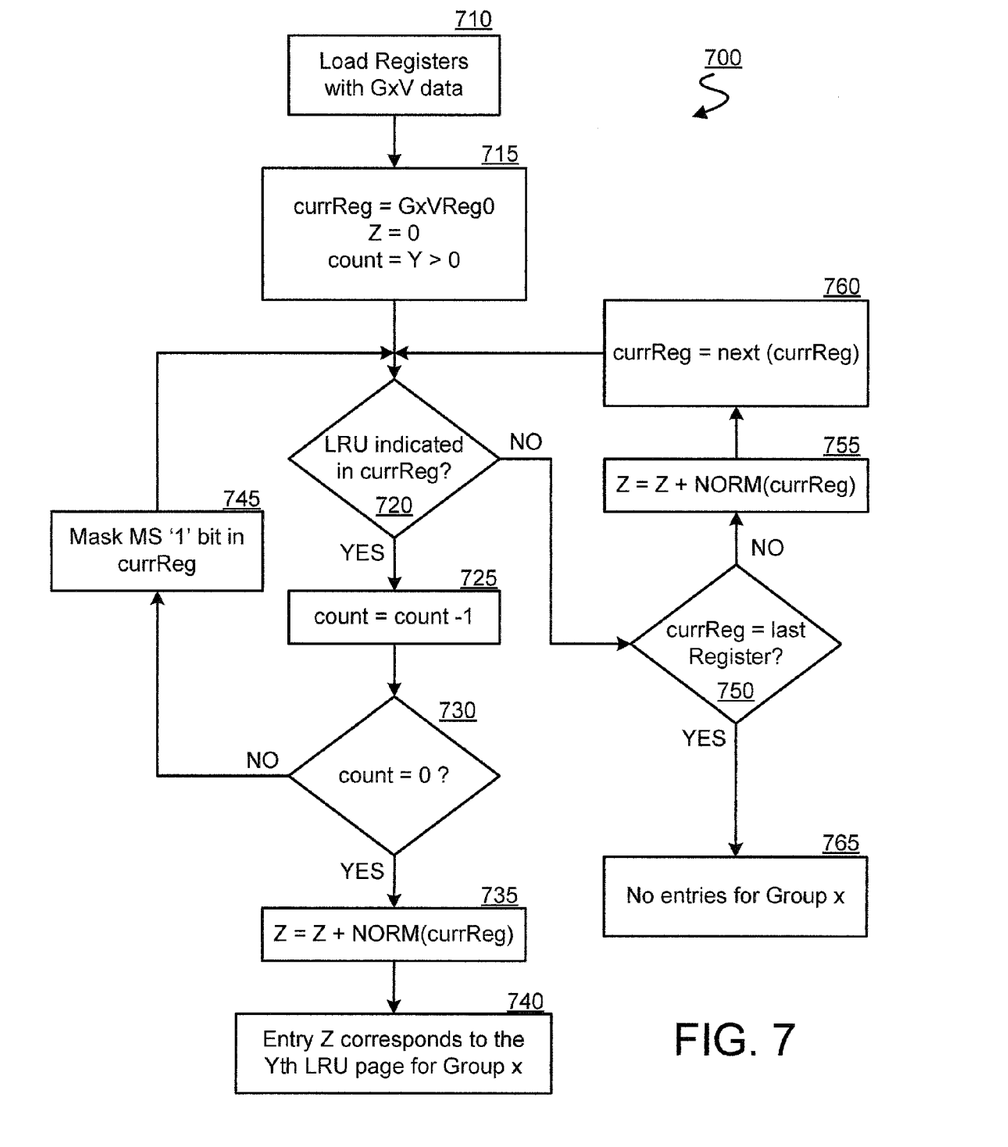
FIG. 7 is a flow diagram illustrating select elements of a method for generating access information according to an embodiment.

FIG. 7 illustrates select elements of a method 700 to generate access information according to an embodiment. By way of illustration and not limitation, some or all of method 700 may be performed by a page management engine—e.g. the touch detection logic 224 of page management engine 220.

Method 700 may process group-valid values such as that in the set of registers 500, for example. In an embodiment, method 700 includes, at 710, loading a sequence of registers with LTL group-valid values (GxV) associated with some memory group x. At 715, a variable currReg is set to an initial register GxVReg0 in the sequence of registers being evaluated by method 700. Furthermore, some variable Z is set to zero (0) for subsequent tracking of bits in the sequence of registers which have been evaluated. Further still, some variable count may be set to Y—i.e. some positive integer value—where method 700 is to determine an LTL entry for the Yth least recently used memory region in memory group x.

At 720, a determination is made as to whether the register currReg includes data indicating a least recently used memory region—e.g. by performing a NORM(currReg) operation as discussed above. If it is determined that currReg includes data indicating the next LRU memory region, the variable count may be decremented by one, at 725. At determination may then be made, at 730, as to whether the variable count is equal to zero—indicating that the most recently indicated LRU memory region is the sought-after Yth LRU memory region.

If the decremented variable count is equal to zero, then NORM(currReg) may be added to the variable Z, at 735, which may then be provided, at 740, as access information identifying the number of the LTL entry which corresponds to the Yth least recently used memory region within memory group x.

If the decremented variable count is not equal to zero, then at 745, the group-valid value for the most recently indicated LRU memory region is masked from further evaluation—e.g. by setting the current most significant set bit in currReg to "0". After masking the group-valid value for the most recently indicated LRU memory region, method 700 repeats the evaluation at 720.

If, at 720, currReg does not include data indicating a next LRU memory region, then a determination is made, at 750, as to whether currReg is the last register in the sequence of registers storing the group-valid values. If currReg is the last register in the sequence of registers, then a message is returned, at 765, indicating that memory group x is not represented by any entry in the LTL.

If currReg is not the last register in the sequence, then the most recent NORM(currReg) return value may be added to the current variable Z value, at 755. Then, at 760, currReg may be set to the next register in the sequence of registers storing the group-valid values. After setting currReg to the next register for evaluation, method 700 repeats the evaluation at 720. Successive performance of a sequence of operations at 720, 750, 755 and 760—and/or a sequence of operations at 720, 725, 730 and 745—may be performed until a Yth LRU memory region is indicated, or until the entire sequence of registers has been evaluated.

Figure 8:
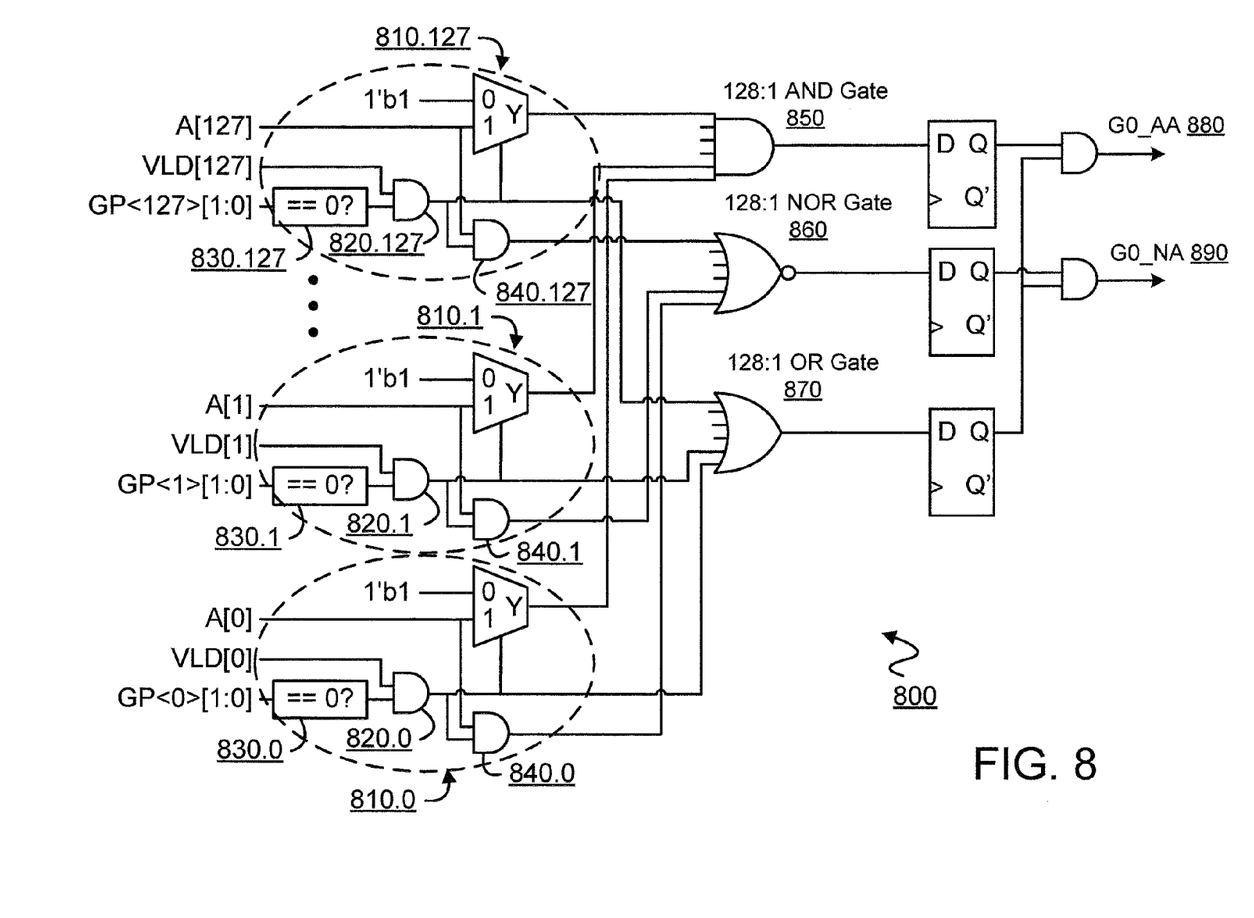
FIG. 8 is a block diagram illustrating select elements of circuitry for generating access information according to an embodiment.

FIG. 8 illustrates select elements of circuitry 800 to generate access information according to an embodiment. Circuitry 800 may include sets of logic gates 810.0, 810.1, . . . , 810.127, each set of logic gates to receive respective inputs based on respective entries of an LTL (not shown)—e.g. LTL 300 having Entry 0, Entry 1, . . . , Entry 127.

By way of illustration and not limitation, an AND gate 820.0 in the set of logic gates 810.0 may receive valid data VLD[0] from the LTL Entry 0. Similarly, AND gates 820.1, . . . , 820.127 in the respective sets of logic gates 810.1, . . . , 810.127 may each receive valid data from Entry 1, . . . , Entry 127, respectively.

Furthermore, AND gate 820.0 may also receive an input indicating whether the Group field of LTL Entry 0 is equal to the memory group of interest. For example, a comparator 830.0 may provide AND gate 820.0 with a logical true signal when a 2-bit input GP<0>[1:0] from the Group field of LTL Entry 0 identifies memory group "0". Similarly, comparators 830.1, . . . , 830.127 may provide signals to AND gates 820.1, . . . , 820.127, respectively, each signal indicating whether a respective one of Entry 1, . . . , Entry 127 identifies memory group "0". In an embodiment, the comparators 830.0, 830.1, . . . , 830.127 may be dynamically configurable to perform comparisons testing for a different memory group at different times.

Each of the outputs of AND gates 820.0, . . . , 820.127 is provided as input to a respective one of AND gates 840.0, 840.1, . . . , 840.127 to be AND'ed with a respective one of A[0], . . . , A[127], the access data of Entry 0, . . . , Entry 127.

The values of access data A[0], . . . , A[127] are variously multiplexed to an AND gate 850 based on the respective outputs of AND gates 820.0, . . . , 820.127. The respective outputs of AND gates 840.0, . . . , 840.127 are input to a NOR gate 860. The respective outputs of AND gates 820.0, . . . , 820.127 are input to an OR gate 870. The outputs of gates 850, 860 and 870 may then be variously ANDed to generate either or both of two signals, G0_AA 880 and G0_NA 890.

In an embodiment, G0_AA 880 identifies that all of the memory regions in the LTL which are associated with the memory group of interest—e.g. memory group "0" in the exemplary case—have been accessed since they were last associated with the memory group. G0_NA 890 identifies that none of the memory regions in the LTL which are associated with the memory group of interest has been accessed since they were last associated with that memory group.

Either or both of G0_AA 880 and G0_NA 890 may be provided as access information—e.g. to group management logic 228—for use in determining whether or how additional memory group configuration may be implemented. For example, G0_AA 880 and/or G0_NA 890 may be used to determine that an additional memory region should be associated with—or disassociated from—a particular memory group. In an embodiment, G0_AA 880 and/or G0_NA 890 may be used to determine that fewer or additional memory groups—and/or a larger or a smaller memory group—may are required for more efficient memory resource utilization. The low overall depth of logic gates required to generate G0_AA 880 and/or G0_NA 890 means that circuitry 800 provides high-speed logic for generating access information responsive to a shift of data in an LTL.

Techniques and architectures for managing computer memory are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   a tracking list including a set of entries, each entry of the set of entries to store state information based on a respective touch message indicating that a respective memory group has been touched, the memory group including one or more memory regions in a set of memory regions, each entry having:
      a valid field to store respective validity data specifying whether the entry stores a set of default data; and
      a group field to store a respective memory group identifier associating a memory region in the set of memory regions with a respective memory group in one or more memory groups; and
   touch detection logic coupled to the tracking list to generate access information specific to a memory group, the access information describing an accessing of one or more memory regions of the memory group, wherein the access information is generated based on the validity data in a first entry of the set of entries and the memory group identifier in the first entry, wherein the touch detection logic to generate access information includes the touch detection logic to perform a NORM instruction on a register including a set of group-valid values, each group-valid value determined based on validity data and a group identifier of a respective one of the set of entries, the NORM instruction to XOR a most significant bit of the register with another bit of the register.

2. The apparatus of claim 1, wherein, for an integer Y, the access information identifies a memory region as being the Yth least recently accessed memory region associated with the memory group.

3. The apparatus of claim 1, wherein each entry of the set of entries further comprises an access field to store an access identifier identifying whether a memory region has been accessed since an associating of the memory region with one of the one or more memory groups.

4. The apparatus of claim 3, wherein the access information is further generated based on the access identifier of the first entry.

5. The apparatus of claim 4, wherein the access information identifies whether each memory region associated with the memory group has been accessed.

6. The apparatus of claim 4, wherein the access information identifies whether all memory regions associated with the memory group have not been accessed.

7. An method comprising:
   in each entry of the set of entries of a tracking list, storing state information based on a respective touch message indicating that a respective memory group has been touched, the memory group including one or more memory regions in a set of memory regions, each storing of state information in an entry including:
      storing in a valid field of the entry respective validity data specifying whether the entry stores a set of default data; and
      storing in a group field of the entry a respective memory group identifier associating a respective memory region in the set of memory regions with a respective memory group in one or more memory groups; and
   generating based on the state information of the tracking list access information specific to a memory group, the access information describing an accessing of one or more memory regions of the memory group, wherein the access information is generated based on the validity data in a first entry of the set of entries and the memory group identifier in the first entry, wherein generating the access information includes performing a NORM instruction on a register including a set of group-valid values, each group-valid value determined based on validity data and a group identifier of a respective one of the set of entries, the NORM instruction to XOR a most significant bit of the register with another bit of the register.

8. The method of claim 7, wherein, for an integer Y, the access information identifies a memory region as being the Yth least recently accessed memory region associated with the memory group.

9. The method of claim 7, wherein each entry of the set of entries further comprises an access field to store an access identifier identifying whether a memory region has been accessed since an associating of the memory region with one of the one or more memory groups.

10. The method of claim 9, wherein the access information identifies whether each memory region associated with the memory group has been accessed.

11. The method of claim 9, wherein the access information identifies whether all memory regions associated with the memory group have not been accessed.

12. A non-transitory computer-readable storage medium having stored thereon instructions which, when executed by one or more processors, perform a method comprising:
  in each entry of the set of entries of a tracking list, storing state information based on a respective touch message indicating that a respective memory group has been touched, the memory group including one or more memory regions in a set of memory regions, each storing of state information in an entry including:
    storing in a valid field of the entry respective validity data specifying whether the entry stores a set of default data; and
    storing in a group field of the entry a respective memory group identifier associating a respective memory region in the set of memory regions with a respective memory group in one or more memory groups; and
  generating based on the state information of the tracking list access information specific to a memory group, the access information describing an accessing of one or more memory regions of the memory group, wherein the access information is generated based on the validity data in a first entry of the set of entries and the memory group identifier in the first entry, wherein generating the access information includes performing a NORM instruction on a register including a set of group-valid values, each group-valid value determined based on validity data and a group identifier of a respective one of the set of entries, the NORM instruction to XOR a most significant bit of the register with another bit of the register.

13. The computer-readable storage medium of claim 12, wherein the access information identifies a memory region as being the least recently accessed memory region associated with the memory group.

14. The computer-readable storage medium of claim 12, wherein, for an integer Y, the access information identifies a memory region as being the Yth least recently accessed memory region associated with the memory group.

15. The computer-readable storage medium of claim 12, wherein each entry of the set of entries further comprises an access field to store an access identifier identifying whether a memory region has been accessed since an associating of the memory region with one of the one or more memory groups.

16. The computer-readable storage medium of claim 15, wherein the access information is further generated based on the access identifier of the first entry.

17. The computer-readable storage medium of claim 16, wherein the access information identifies one of: whether each memory region associated with the memory group has been accessed, and whether all memory regions associated with the memory group have not been accessed.

* * * * *

UNITED STATES PATENT AND TRADEMARK OFFICE
CERTIFICATE OF CORRECTION

PATENT NO. : 8,364,915 B2  
APPLICATION NO. : 12/822034  
DATED : January 29, 2013  
INVENTOR(S) : Lim et al.

Page 1 of 1

It is certified that error appears in the above-identified patent and that said Letters Patent is hereby corrected as shown below:

In the Specification

In column 9, Table 1 line 42 delete, "0×VFFFFFFF" and insert --0×7FFFFFFF--.

Signed and Sealed this  
Twenty-ninth Day of April, 2014

Michelle K. Lee  
*Deputy Director of the United States Patent and Trademark Office*